United States Patent [19]

Bossert et al.

[11] 4,142,541
[45] Mar. 6, 1979

[54] DEVICE FOR CLEANING SURFACES OF FOODS

[76] Inventors: Eduard Bossert, Lindenstr. 22, Gundelfingen; Marlies Aumann, Freiherr-vomstein Str. 6, Braubach, both of Fed. Rep. of Germany

[21] Appl. No.: 727,656

[22] Filed: Sep. 29, 1976

[30] Foreign Application Priority Data

Sep. 30, 1975 [DE] Fed. Rep. of Germany ....... 2543550

[51] Int. Cl.² .............................................. B08B 3/06
[52] U.S. Cl. .................................. 134/143; 134/25 A; 134/159; 134/165; 99/516
[58] Field of Search ............ 134/159, 56 R, 100, 134/92-94, 140, 142-143, 149, 155, 158, 165, 153, 200, 154, 156-157, 182-183, 25 R, 25 A; 99/483, 516

[56] References Cited

U.S. PATENT DOCUMENTS

| 729,536 | 6/1903 | Brown | 134/156 |
|---|---|---|---|
| 948,679 | 2/1910 | Brandenburg | 134/159 X |
| 1,914,016 | 6/1933 | Hobi | 134/94 X |
| 2,568,838 | 9/1951 | Wilcox | 134/154 |
| 2,696,216 | 12/1954 | Meyer | 134/159 X |
| 2,698,022 | 12/1954 | Fahnoe | 134/94 X |
| 2,857,922 | 10/1958 | Effinger | 134/165 X |
| 2,994,330 | 8/1961 | Catlin et al. | 134/140 X |
| 3,093,149 | 6/1963 | Jaffe et al. | 134/159 X |
| 3,642,013 | 2/1972 | Thierstein | 134/200 X |
| 3,909,291 | 9/1975 | Leong | 134/159 X |

FOREIGN PATENT DOCUMENTS

| 432188 | 8/1926 | Fed. Rep. of Germany | 134/159 |
|---|---|---|---|
| 613179 | 11/1960 | Italy | 134/159 |
| 253226 | 11/1948 | Switzerland | 134/153 |

*Primary Examiner*—Robert L. Bleutge
*Attorney, Agent, or Firm*—Irvin A. Lavine

[57] ABSTRACT

A device for cleaning the surfaces of foods comprising a watertight housing with a door, a drum movable into the housing through the door, the drum being rotated by a motor, the drum containing perforated baskets each having a movable wall to engage and hold products therein against movement, and means for rotating the movable wall in selected position.

16 Claims, 8 Drawing Figures

DEVICE FOR CLEANING SURFACES OF FOODS

The invention relates to a device for cleaning the surfaces of foods.

The surfaces of food are frequently contaminated with contaminants and noxious substances. In the case of fruits and vegetables, these contaminants can come from fertilizers or pesticides, or result from air pollution. Surface contamination of meat and other foods can also result from air pollution. Moreover, preservatives are frequently applied to the surfaces of all types of foods. Thus, for healthy nutrition, it is advantageous if not essential to clean food surfaces before eating. Since these contaminants and noxious substances often adhere very firmly. The usual mere washing in running hot or cold water is usually insufficient to remove these contaminants more or less completely The problem with which the invention deals is to arrive at a device which makes it possible to clean food surfaces thoroughly without impairing the appearance, taste or texture of the food, even of delicate foods.

This problem is solved according to the invention by a device characterized by a closable drum the walls whereof are provided with holes, mounted in a rotatable watertight sealable housing, by a drive motor for the drum, and by baskets installable in the drum with sector-shaped cross sections, one radial side wall of said baskets being pivoting and lockable.

Very intensive and thorough surface cleaning of foods is possible with the device according to the invention. The foods are loaded into the drum and agitated in the cleaning fluid by the motor-driven drum. If the cleaning fluid is water only, due to the intensive movement of the food in this cleaning fluid, the surface cleaning is already considerably better than the cleaning possible when the food is simply rinsed in running water. The purpose is better served, however, if a cleaning agent is added to the water, as described in German Patent Application No. 25 39 928.4, whereby the surface cleaning is particularly intensive, even firmly adhering contaminants and noxious substances being removed.

The baskets installable in the drum ensure, according to the invention, that when the drum rotates, the food items do not tumble over each other so that their surfaces are damaged. With the aid of the pivoting side walls of the baskets, it is possible to immobilize the food in the drum, even when the drum is only partially full. For this purpose, the side walls are pivoted until they fit closely against the food loaded into the baskets, and are then locked in this position.

It is advantageous for the drum to be mounted removably by means of trunnions in the end walls of the housing. This permits easy, gentle loading of the food, which is particularly necessary for delicate foods such as fruits. It also makes it easier to remove the drum to clean the device.

In one embodiment of the invention, a trunnion is rotatably mounted on the rear end wall of the housing, drivably connected with the motor, is provided with lateral drive pins at its free end, and engages with this end a bushing in the rear drum end wall, which bushing has corresponding lateral recesses.

The entire drive system is mounted firmly in the housing in this embodiment, and the drum can be pulled away with the greatest of ease, for removal from the trunnion serving as a drive shaft, or pushed back when replaced.

The drum itself can be mounted in the housing with a vertical or horizontal axis of rotation. If the drum is mounted horizontally in the housing, an especially convenient installation of the drum in a refinement of this embodiment is made possible by the fact that the drum is provided at its front end wall with a firmly mounted trunnion, said trunnion engaging a semicircular bearing mounted on the front openable end wall of the housing.

In a further embodiment of the invention, a runner is provided below the horizontally mounted drum, said runner travelling in tracks to allow the drum to be removed from the housing; the tracks are mounted in the housing and extend across the end wall of the housing which can be opened down into a horizontal position. In this embodiment, to allow the drum to be removed, the latter need only be disengaged from the rear trunnion so that it comes to rest on the runner and can then be drawn out, with this runner sliding in the tracks onto the end wall of the housing which has been opened into a horizontal position. This makes the drum easily accessible for opening, filling, and emptying.

The runner makes the drum particularly convenient to slide back against the rear trunnion, since the runner centers the drum positively on this trunnion.

A particularly advantageous embodiment is one in which one end wall of the drum can be opened by means of a hinge and locked by means of a bayonet lock. This drum can be mounted vertically on the open front end wall of the housing, making the installation of the baskets and the loading and removal of the food particularly convenient.

The radial side walls of the baskets are made especially easily adjustable by the baskets being provided with axially projecting pins, which project through curved slots in the drum end walls and are lockable in these slots.

Advantageously, the housing is provided with a float-controlled water supply, so that an optimum water level for the cleaning process is always maintained.

If the device is operated using a cleaning agent, as described in the aforementioned German Patent Application No. 25 39 928.4, it is advantageous to provide a reservoir for the cleaning agent in the housing. To make this reservoir easily accessible, it can be mounted in the vicinity of the housing opening. To make it convenient to add the cleaning agent, which is supplied for example packed in plasic bags, the reservoir can be made funnel-shaped and be provided with a cutter at its lower outlet opening. In this embodiment, the closed plastic bag containing the cleaning agent can be placed in the reservoir, and only then opened by the cutter.

Moreover, a dispenser can be provided at the outlet opening of the reservoir, allowing a precisely metered feed of the cleaning agent.

One embodiment of the invention is described in greater detail below with reference to the attached drawings.

Figure 1:
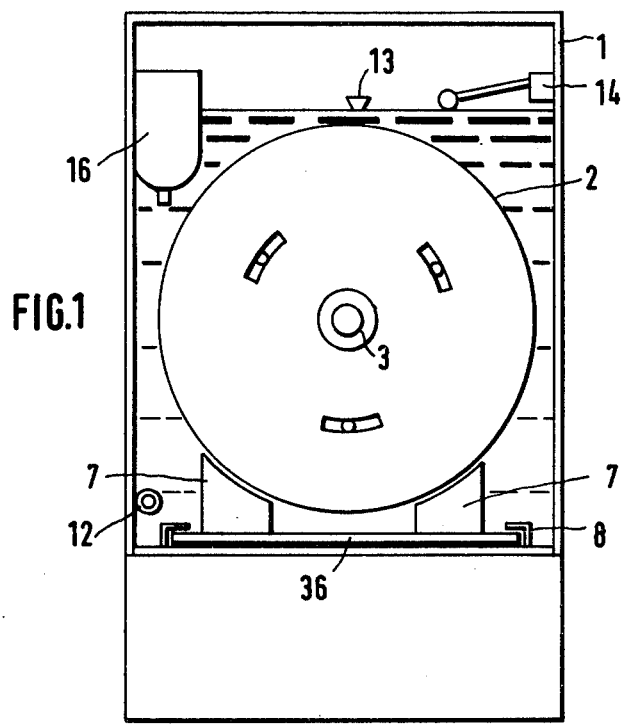
FIG. 1 is a schematic front elevation of a device according to the invention with the drum in place and the front wall of the housing removed.
Figure 2:
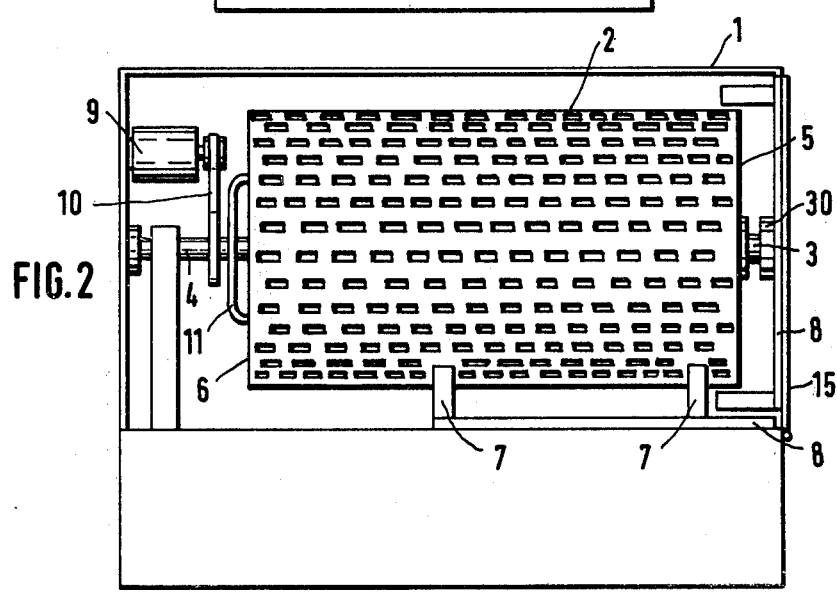
FIG. 2 is a schematic side elevation of the device shown in FIG. 1, with the side wall of the housing removed.

The device shown in the drawing consists of a box-shaped housing 1, wherein a cylindrical drum 2 is horizontally and rotatably mounted, the wall of said drum being perforated, so that the cleaning fluid can enter the interior of the drum in the housing unimpeded. The housing can be heat-insulated, allowing it to be used as a fresh-storage container.

The drum is mounted on a centrally located trunnion 3 firmly attached to the front end wall 5, said trunnion engaging a semicircular bearing 30, which is attached to the front end wall of housing 15. This mounting is shown in cross section in FIG. 7.

Figures 6, 7:
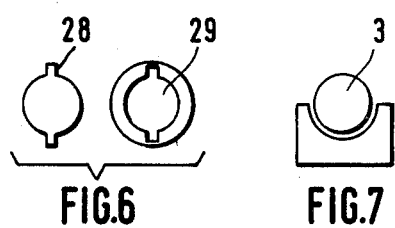
FIG. 6 is the trunnion and mounting bushing on the rear end of the housing and the drum in cross section.
FIG. 7 shows the trunnion and the bearing on the front end of the drum and the housing in cross section.

The mounting at the rear end consists of a trunnion 4, rotatably mounted on the rear end wall of the housing, said trunnion serving simultaneously as a drive shaft to rotate drum 2. In addition, drive motor 9, preferably an electric motor, is mounted in the interior of the housing, said motor driving trunnion 4 via a drive, for example a belt drive 10. As shown in detail in FIG. 6, trunnion 4 is provided at its free end with radial outwardly projecting lateral drive pins 28. The free end of trunnion 4 rests in a bushing 29, centrally mounted on the rear end wall 6 of drum 2, and provided with lateral recesses matching drive pins 28, as shown in FIG. 6. For better transmission of the torque from trunnion 4 to drum 2, drive straps 11 can also be provided, said straps being attachable to the drum at end wall 6 and gripping and holding the entire drum on the outside in basket fashion. The drive straps 11 extend radially and terminate in axially extending end portions.

Guide tracks 8 are provided on the floor of housing 1 beneath drum 2, and run parallel to the lengthwise axis of the drum. A runner 36 slides in these tracks and is provided with brackets 7 which rest directly against the circumference of drum 2, so that drum 2, resting on these brackets, can be pulled out from the rear bearing and in particular will be centered when pushed back into this bearing.

Figure 3:
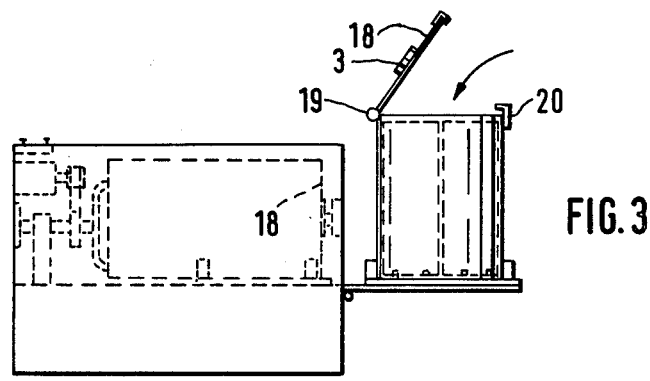
FIG. 3 is a schematic representation of the drum when removed and when stood upright.

As shown particularly in FIG. 3, the front end wall 15 of housing 1 is designed as a flap door, and opens downward into a horizontal position. Guide tracks 8 are likewise provided on the inside of front end wall 15, and connect with tracks 8 in the housing when end wall 15 is opened, so that runner 36 carrying the drum can slide out of the housing onto the opened end wall 15.

Front end wall 5 of drum 2 is designed as a lid 18, hinged to open by means of a hinge 19 and capable of being locked in the closed position by means of a bayonet lock 20. To open drum 2, as shown in FIG. 3, the latter can be stood upright on the open front end wall 15 of the housing.

Baskets 38 are installed in drum 2, and have a sector-shaped cross section to maximize the utilization of the internal space of the drum. The walls of the baskets are likewise perforated to allow free access of the cleaning fluid to the interior of the baskets.

Figure 5:
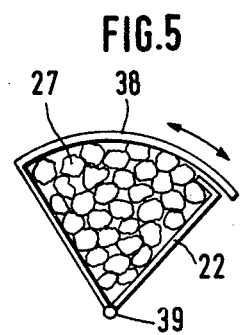
FIG. 5 is a top view of an individual filled basket.

As shown in FIG. 5, baskets 38 are provided with one fixed radial side wall and one side wall firmly attached thereto and extending circumferentially. The second radially extending side wall 22 is pivotally articulated at 39 to the fixed basket wall. This makes it possible to pivot this side wall 22 in the direction indicated by the arrow after the food 27 to be cleaned has been loaded into basket 38, until the loaded food is pressed close together in the basket. In this manner the food is prevented from tumbling as the drum rotates during the cleaning process independently of the quality of food, i.e., whether the basket is partially or completely filled.

Figure 4:
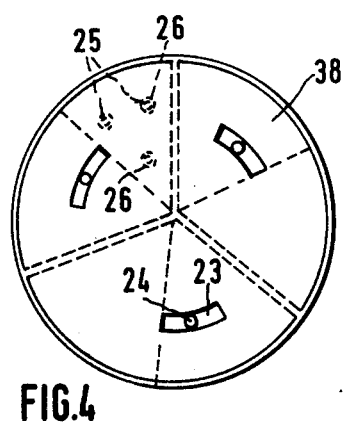
FIG. 4 is a top view of the end of the cylinder with baskets in place.

As shown in FIG. 4, pins 25, which fit into matching bushings 26 in the bottoms of the baskets, are provided on the inside of rear end wall 6 of drum 2. These pins 25 and bushings 26 hold baskets 28 when they have been installed in the drum. Each pivoting side wall 22 of basket 38 is provided with a pin 24 extending through a curved slot in front end wall 5 and lockable in this slot 23. This allows the size of the basket to be adjusted conveniently and reliably.

The water supply to housing 1 is controlled by a water inlet 12, while an overflow 13 controls the water level at the top. A float 14 is also provided to control the water supply.

As shown in FIG. 1, a reservoir 16 is provided on the side wall of the housing in the vicinity of openable end wall 15. This reservoir 16 is shown enlarged in FIG. 8.

Reservoir 16 is open at the top and tapers toward its lower end like a funnel. This reservoir can be filled with a cleaning agent to be added to the washwater. A dispenser 34 provided at the lower funnel-shaped outlet opening of reservoir 16 can be used to add the cleaning agent contained in funnel 16 in measured amounts to the washwater.

Advantageously, a cutter 33 is provided at the lower outlet opening of reservoir 16. This cutter 33 has the advantage that the cleaning agent 31 which is used, sealed in a plastic bag 32, can be placed in reservoir 16. Bag 32 is opened by cutter 33 only after bag 32 containing the cleaning agent has been placed in the reservoir so that cleaning agent 31 can be dispensed. Hence, the user of the cleaning device need never come in contact with the cleaning agent. In particular, when this device is used in the home, there is less danger of children coming into contact with the exposed cleaning agent.

Figure 8:
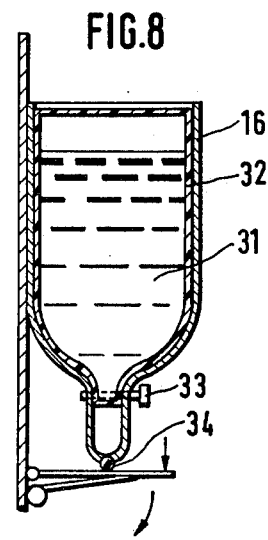
FIG. 8 is a schematic representation of a reservoir for adding cleaning agents.

As shown in FIG. 8, for example, dispenser 34 consists of a flap under spring tension, provided with a ball valve, and can be opened as needed by water pressure from a mixing nozzle.

The following are examples of the sequence of a cleaning cycle using the device according to the invention:

First Stage

| | |
|---|---|
| 1: water inlet valve opens; | 1 sec. |
| 2: float closes water inlet valve; | 40 sec. |
| 3: drum makes 20 turns to left and 20 turns to right; | 1 min. |
| 4. drain valve opens; | 1 sec. |
| 5. water drains; | 40 sec. |
| 6. water drain valve closes; | 1 sec. |

Second Stage:

| | |
|---|---|
| 1. cleaning agent added; | 3 sec. |
| 2. water inlet valve opens; | 1 sec. |
| 3. water flows in; | 40 sec. |
| 4. water inlet valve closes; | 1 sec. |
| 5. stop to allow cleaning agent to work; | 1 min. |
| 6. 20 turns to left and 20 turns to right; | 1 min. |
| 7. water drain valve opens; | 1 sec. |
| 8. water drains; | 40 sec. |

9. water drain valve closes; 1 sec.
Third Stage:
1. water inlet valve opens; 1 sec.
2. water flows in; 40 sec.
3. water inlet valve closes; 1 sec.
4. drum makes 20 turns to left and 20 turns to right; 1 min.
5. water drain valve opens; 1 sec.
6. water drains; 40 sec.
7. water drain valve closes; 1 sec.
Fourth Stage:
1. water inlet valve opens; 1 sec.
2. water flows in; 40 sec.
3. float closes water inlet valve; 1 sec.
4. drum makes 20 turns to left and 20 turns to right; 1 min.
5. water drain valve opens; 1 sec.
6. water drains; 40 sec.
Fifth Stage:
1 spin dry at approx. 60 rpm 1 min.
2. water drain valve closes 1 sec.
3. "end cleaning" signal, e.g. by red signal light;1 sec.

We claim:

1. Apparatus for cleaning the surfaces of foods comprising:
 (a) a water tight housing including a movable wall for permitting entry into said housing;
 (b) a drum dimensioned relative to said movable wall for entry into said housing, said drum having perforations therein;
 (c) means for rotatably mounting said drum in said housing;
 (d) means for rotating said drum in said housing, and
 (e) a basket within the drum, said basket being sector-shaped in cross section and comprising a pair of radially extending walls, means pivotally supporting one said radially extending wall for movement towards or away from the other said radially extending wall, and means for locking said one wall in any one of a number of selected positions, said basket being perforated, whereby to immobilize material in said basket independently of the quantity of such material therein when said drum is rotated and fluid moves in contact with said articles.

2. The apparatus of claim 1 wherein said means for rotatably mounting said drum comprises trunnion means releasably supporting said drum.

3. The apparatus of claim 1, wherein said means for rotatably mounting said drum comprises a trunion, means rotatably supporting said trunnion in said housing, bushing means on an end wall of said drum for engaging said trunnion and supporting said drum on said trunnion, and wherein said means for rotating said drum comprises a motor, means drivingly connecting said motor to said rotatable trunnion, and means drivingly connecting said rotatable trunnion to said drum.

4. The apparatus of claim 3, wherein said last mentioned means comprises radial recess means in said bushing means and radial pin means on said trunnion engaging therewith.

5. The apparatus of claim 4, wherein said last mentioned means comprises radially extending straps secured to said trunnion and terminating in axially extending end portions engaging said drum.

6. The apparatus of claim 1, wherein said means for rotatably mounting said drum comprises a trunnion supported on and extending from a wall of said drum, and a semicircular bearing mounted on a wall of said drum, said bearing rotatably receiving said trunnion.

7. The apparatus of claim 1, drum mounting means comprising means for mounting said drum with its axis horizontal, and means for enabling horizontal movement of said drum out of said housing, said means comprising tracks in said housing and runner means for engaging said tracks and supporting said drum.

8. The apparatus of claim 7, wherein said movable wall is an end wall of said housing movable from a vertical position closing said housing to a horizontal position, and tracks on said movable end wall, said tracks on said end wall connecting with tracks in said housing.

9. The apparatus of claim 1, said movable wall being an end wall of said housing, means pivotally connecting said wall to said housing, and means for locking said end wall in closed position.

10. The apparatus of claim 1, wherein said one radially extending wall of each of said baskets has a pin extending axially therefrom, said drum including an end wall, arcuate slots in said end wall, said pins extending through said slots, said pins being lockable in said slots to thereby lock said one radially extending wall of each basket in a selected position.

11. The apparatus of claim 1, and a float controlled water supply for said housing.

12. The apparatus of claim 1, and a reservoir in said housing for a cleaning agent.

13. The apparatus of claim 12, said reservoir being located in the vicinity of said movable wall.

14. The apparatus of claim 12, said reservoir having a funnel shape at its lower end, and a cutter adjacent the lower end thereof.

15. The apparatus of claim 12, said reservoir having a dispenser at the lower end thereof.

16. The apparatus of claim 1, said housing being heat insulating.

* * * * *